United States Patent [19]
Wallace

[11] 3,976,290
[45] Aug. 24, 1976

[54] DOCUMENT VIEW STATION

[75] Inventor: Harry L. Wallace, Garden City, Mich.

[73] Assignee: Burroughs Corporation, Detroit, Mich.

[22] Filed: Nov. 3, 1975

[21] Appl. No.: 628,386

Related U.S. Application Data

[63] Continuation-in-part of Ser. No. 609,222, Sept. 2, 1975.

[52] U.S. Cl. .................................. 271/64; 271/184; 271/225; 271/258
[51] Int. Cl.² .................... B65H 29/20; B65H 29/58
[58] Field of Search ............. 271/64, 225, 184, 185, 271/258, 265

[56] References Cited
FOREIGN PATENTS OR APPLICATIONS 1,284,129  11/1968  Germany ........................... 271/185
573,694    2/1958   Italy ................................... 271/184

*Primary Examiner*—Richard A. Schacher
*Attorney, Agent, or Firm*—Edwin W. Uren; Kevin R. Peterson

[57] ABSTRACT

Disclosed is a document view station adjacent to a document guideway that will, upon being alerted to a misread document, ready itself to intercept the misread document. Once intercepted the misread document may be cammed out of the guideway to a position where it may be easily viewed, tactilibly manipulated, and optionally cammed back to its original location in the document stream for further processing. The document view station additionally has the ability to self-adjust its camming to the width of the document.

34 Claims, 5 Drawing Figures

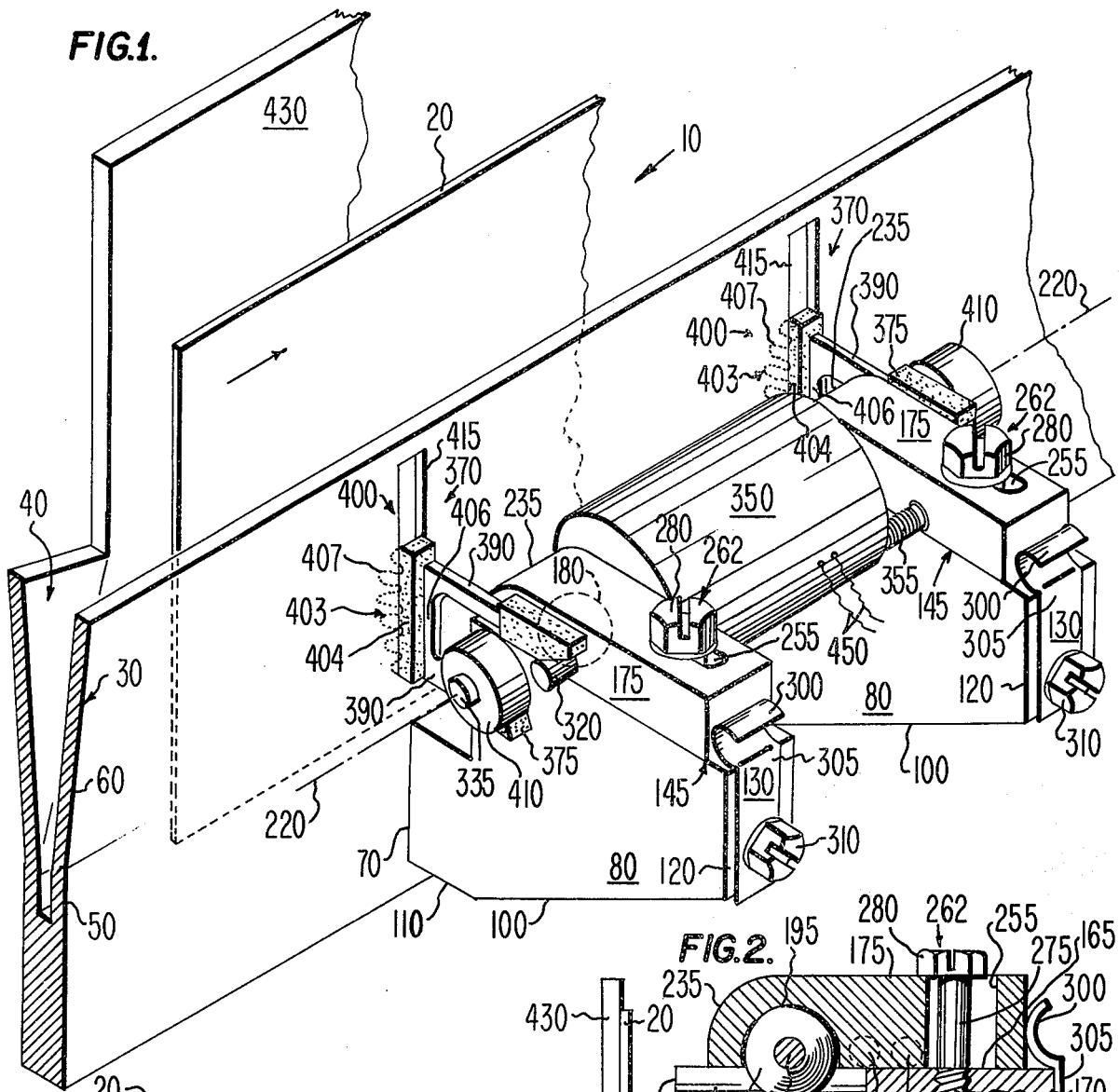
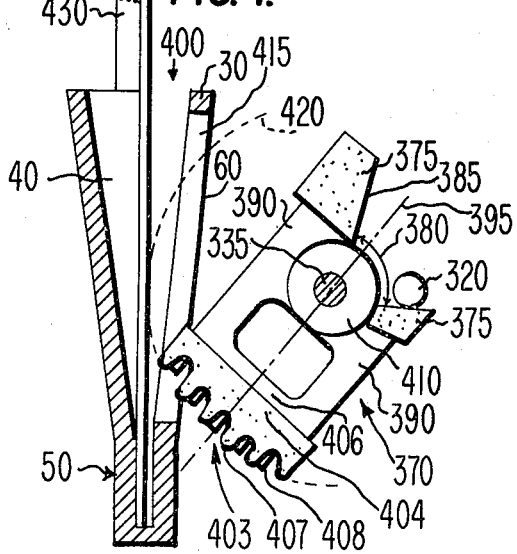
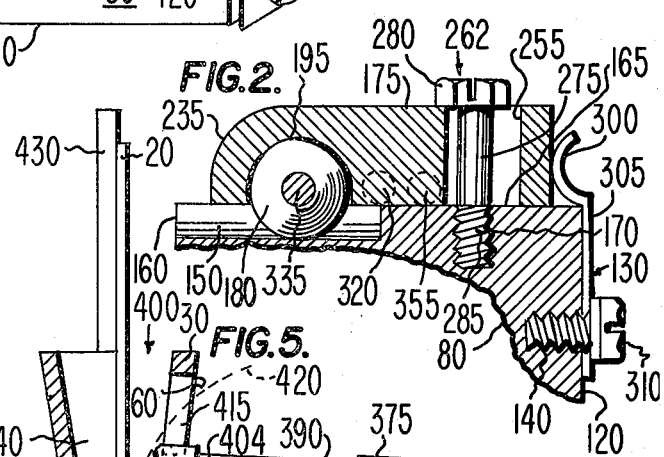
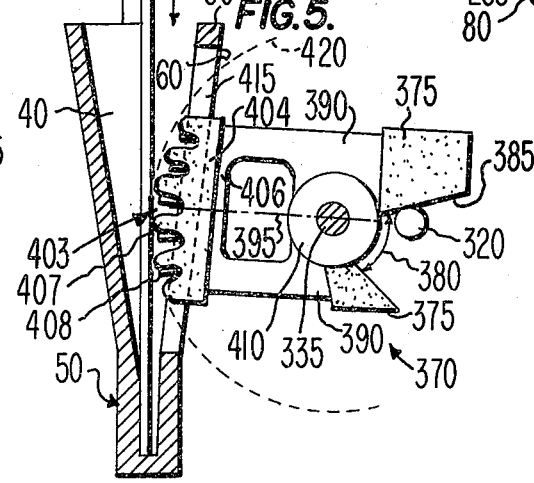

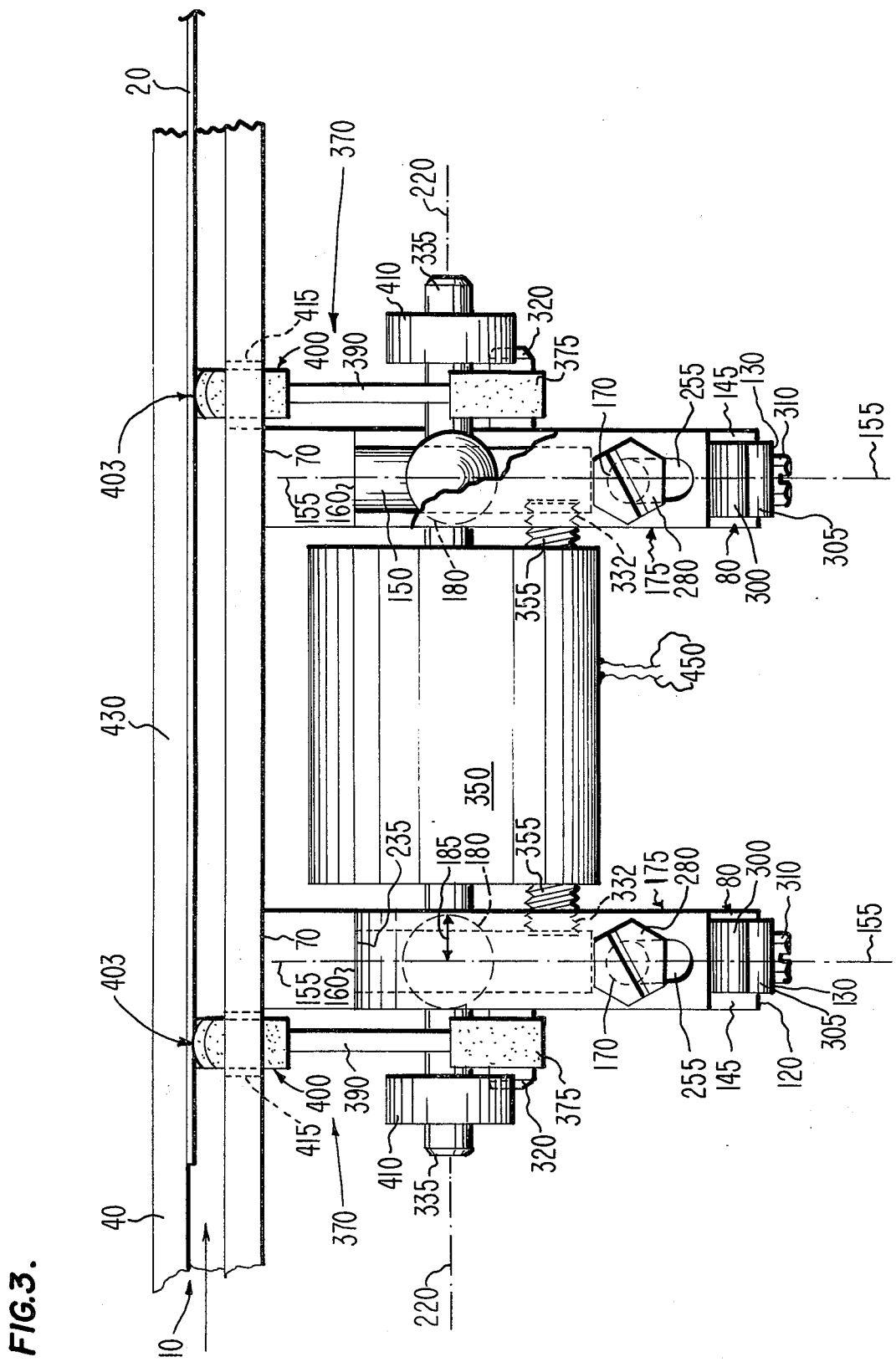

DOCUMENT VIEW STATION

CROSS-REFERENCE TO RELATED APPLICATIONS

This application is a continuation-in-part of application Ser. No. 609,222, filed on Sept. 2, 1975 by the present inventor.

BACKGROUND OF THE INVENTION

1. Field of the Invention

This invention relates to document view stations in general and particularly to document view stations that are able to cam documents out of a guideway for ease of viewing.

2. Prior Art

In the past where there was a document transport system comprising a reader that interfaced with an associated document guideway, documents flowing down the guideway that were misread would be rejected and diverted off from the main stream of documents for later off-line correction. this had the obvious disadvantage of temporarily losing those misread documents as to the current batch being processed. As such, the batch being updated, minus the misread documents, would not provide an accurate reflection of its true state.

Where systems have provided for on-line correction of misread documents without diversion, the misread documents have generally been physically removed from the guideway for review and error assessment. The on-line correction of documents in such systems generally involved the actual tactile removal of the misread documents from the document guideway, thereby risking accidental multilation of the documents in the process of removal.

Another related problem is such prior art systems involved the tactile reinsertion of the removed documents in the guideway, thereby risking placement of the removed documents in the wrong place relative to the queued document stream.

A final problem in prior art systems derived directly from the normal quality variance as to the width of the document guideway and the thickness of the documents themselves. A device for automatically intervening to remove and to reinstate documents in the document stream may accordingly apply too weak or too strong a pressure to a misread document that is to be withdrawn from the document stream, by reason of guideway width variables and document thickness variables.

SUMMARY OF THE INVENTION

It is thus an important object of the present invention to provide a document view station that can intercept documents in a guideway that have been previously determined to require out of guideway viewing, and that will permit convenient tactile manipulation of the removed documents and optional return of the documents to their original location in the guideway.

It is a further object of the invention to provide means for frictionally camming documents out of a guideway, and then camming them back to their original relative position in the guideway without direct tactile intervention during the camming process.

It is yet another object of the invention to provide means for self-adjusting the camming of the documents in the guideway, so as to apply at least a minimum pressure to even a relatively narrow width (thickness) document.

It is still another object of the invention to provide means for stopping and reversing the direction of camming in the absence of complicated clutching devices.

In carrying out the objects of the invention, a system is provided whereby when a reader station indicates a misread document, a misread flagging signal is delayably sent to a document view station at a time calculated to coincide with the arrival of the misread document at said document view station. Also, concurrently with the sending of the misread signal, a document flow-stop signal is sent to the feeder rollers along the guideway thereby interrupting the flow of documents. Upon arrival at the document view station, the misread document is positioned directly adjacent to a camming mechanism forming a part thereof. The camming mechanism is rendered effective for frictionally moving the misread document in a tangential arc against an opposing wall of the guideway, while at the same time self-adjusting itself to the document's thickness. As a result of this frictional camming movement, the document is lifted upward into a zone where it may be easily viewed by the operator and also tactilely manipulated if so needed. Once viewed by the operator, the camming mechanism may be reversed so as to return the document to its original position relative to the flow of documents. With the knowledge gained from observing the document at the document view station, the operator may make any derived actual corrections to the misread document at a write station located farther downstream in the guideway.

BRIEF DESCRIPTION OF THE DRAWINGS

Various other objects, advantages and meritorious features of the invention will become more fully apparent from the following specification, appended claims and accompanying drawing sheets.

The features of a specific embodiment of the invention are illustrated in the drawing figures in which:

FIG. 1 is a perspective view of the inventive document view station;

FIG. 2 is a cut away side view of the self-adjusting mechanism of the document view station of FIG. 1;

FIG. 3 is a plan view of the self-adjusting mechanism of the document view station of FIG. 1;

FIG. 4 is a side view of the camming mechanism of the document view station of FIG. 1 as it begins its upward arc; and FIG. 5 is a side view of the camming mechanism of the document view station of FIG. 1 when it has completed its upward arc.

DESCRIPTION OF THE PREFERRED EMBODIMENT

Referring to FIGS. 1 through 5 by the characters of reference, there is illustrated an apparatus for carrying out the objects of the invention. In the preferred embodiment of the invention as shown in FIG. 1, a guideway 10 serves as a channel or queue for a flow or stream of documents 20. Walls 30 and 40 of the guideway 10 are substantially parallel in their lower portion 50 so as to give lateral support to the documents 20 as they flow through. The walls 30 and 40 of the upper portion 60 of the guideway 10 are formed to increasingly diverge at relatively higher levels so as not to contact and thus unnecessarily bind the documents 20 in the course of their flow.

Abuttably supported at 70 on the lower portion 50 of the wall 30, hereinafter referred to as the near wall 30, are a pair of spaced-apart frame members 80 which are cut back at right angles to provide clearance for the diverging upper portion 60 of the near wall 30. A bottom side 100 of the frame members 80 are cut back at a diagonal running from a deep end 110 thereof to also provide clearance relative to other operating mechanisms of the document reader. A rear side 120 of the frame members 80 are substantially planar and parallel to the lower portion 50 of the near wall 30, to accommodate the mounting of a pair of leaf springs 130 thereon, as will be described infra. A threaded bore 140, as shown in FIG. 2, is formed in the planar side 120 of each of the frame members 80 to provide the exact means for mounting the leaf spring 130 thereto as also will be seen infra. On the top sides 145 of each of the frame members 80, in a portion adjacent the near wall 30, is formed a concave raceway 150 having a longitudinal axis 155, as shown in FIG. 3, such raceways being open ended at 160 (FIG. 2) in the extremities thereof adjacent the surface 70 of the near wall 30. Formed in rear portions 165 of the top sides 145 are thereaded bores 170 which provides means for attaching a pair of cap members 175 to the frame members 80.

Operatively positioned within the raceways 150 and freely rotatable along the longitudinal axes 155 thereof when not otherwise restrained, are a pair of spherical bearings 180 as shown in FIGS. 2 and 3 whose radii 185 are only slightly less than the radii of the raceways 150, thus facilitating close tracking along the raceways 150. the spherical bearings 180 are operative to act as buffers as between the cap members 175 and the frame members 80. The spherical bearings 180 may be composed of nylon or a similar self-lubricating material to minimize friction when the spherical bearings 180 move in the raceways 150.

Acting as covers for the top sides 145 of the frame members 80, and as part of the self-adjusting mechanism, are the aforementioned cap members 175, as further shown in FIGS. 1, 2 and 3, that may be formed of a metallic material. In portions adjacent the near wall 30, each of the cap members 175 has formed therein an open-ended notch 195 that traverses the width of the cap member 175 and communicates with the underside thereof. The longitudinal axis 220 of each of the notches 195 is disposed in perpendicular relationship to the longitudinal axis 155 of its corresponding raceway 150 and has a radius only slightly larger than the radius 185 of its corresponding spherical bearing 180, as shown in FIG. 3. The notches 195 encompass the top portions of the spherical bearings 180, and thus act as restraints that guide the spherical bearings 180 in their trcking along the raceways 150. The innermost edges of the cap members 175 adjacent the near wall 30 are provided with convex surfaces, as shown at 235 in FIGS. 1, 2 and 3, to provide clearance for the diverging upper portion 60 of the guideway 10.

In portions of the cap members 175 opposite the convex surfaces 235, eccentrical smooth-sided bores 255 are provided, as best shown in FIGS. 1 and 3. Traversing each of the eccentrical bores 255 is a metal screw 262 having a head portion 280, a smooth-surfaced intermediate portion 275, and a threaded bottom portion 285 that cooperates with the threaded bore 170 formed in the corresponding frame member 80. When the metal screws 262 are so adjusted as to permit longitudinal movement of the cap members 175 relative to the frame members 80, and movement also of the spherical bearings 180 relative to the raceways 150, the cap members 175 and notches 195 thereof are rendered susceptible to the biasing force applied by the aforementioned leaf springs 130, as hereinafter explained. When, however, the metal screws 262 are tightened in the bores 170, the cap members 175 and raceways 150 are locked in relative position along their respective longitudinal axis 155. As such, when screwably tightened, the metal screws 262 act as lock slides in relation to the cap members 175.

As best shown in FIG. 2, the leaf springs 130 are operative to apply a constant pressure against the cap members 175 in the direction of the near wall 30, when the screws 262 are backed away from their fully tightened positions in the bores 170. Top portions 300 of the leaf springs 130 are curved convexly to operatively contact the outermost ends of the cap members 175, while the lower planar portions 305 thereof are restrained in place against the planar sides 120 of the frame members 80. This actual restraint is effected by means of metal screws 310 that traverse apertures formed in the planar ends 305 of the leaf springs 130, to be screwed into the threaded bores 140 in the planar sides 120 of the frame members 80. On the outer opposite sides of the cap members 175, approximately midway in their linear expanse, are a pair of outwardly directed solid cylindrical projections 320 which weldably abut against the cap members 175. Also midway of each of the cap members 175 is a notch 332 formed to open into the innermost lateral side thereof and to communicate with the underside of the cap member 175, the function of said projections 320 and notches 332 being defined infra.

The previously mentioned spherical bearings 180 are each provided with a central bore that is traversed by a shaft 335 formed of a metallic material, the pair of shafts 335 being coaxially disposed relative to the longitudinal axes 220 of the notches 195 formed in the cap members 175, and being also connected at their innermost ends to a DC motor 350, as shown in FIGS. 1 and 3. The shafts 335 are carried as a load by the spherical bearings 180 which, unless otherwise restrained, may freely rotate about and translate along the axes 220 of the shafts 335. The motor 350 is low powered and provides the rotational energy to drive the shafts 335 in a direct-drive radial mode, where the longitudinal axis 220 of the motor 350 is coincidental to that of the shafts' axes. Restraining the motor 350 from rotating on its own longitudinal axis is a metal projection or screw 355 disposed in parallel relationship to the axes 220 of the shafts 335, such screw 355 being adjustable in and out of the motor 350. The metal screw 355 is operative to be fitted into one of the aforementioned restraint notches 332 which has a radius only slightly larger than that of the metal screw for predeterminably setting the relative position of the motor 350 as to the cap members 175.

Abuttably secured to the outermost ends of the shafts 335, as shown in FIGS. 4 and 5, are a pair of camming arms generally designated 370 which are perpendicularly and radially disposed relative to the axes of the shafts. Each of the camming arms 370 is comprised of a pair of elongated projections 375 disposed on the opposite side of the shaft 335 from the near wall 30, said elongated projections being weighted and set a fixed arcuate distance 380 from each other relative to the axis of the shaft. The weighting of the projections 375 serves to counteract the moment generated by the remainder of the camming arm 370, thus defining a center of gravity that is substantially within the shaft's axis, as will be seen infra. The fixed arcuate distance 380 comprises the acute angle of 60°. The pair of elongated projections 375 of the pair of camming arms 370, in cooperation with the aforementioned cylindrical projections 320, also act as upper and lower limits for restraining the arcuate travel of the arms 370 about the axes 220 of the shafts. Insulating the remainder of each of the camming arms 370 from the shock and vibration that is generated when one of the pair of elongated projections 375 makes contact with its corresponding cylindrical projection 320, is a resilient coating 385 such as rubber disposed on the surfaces of the weighted projections 375 that contact the cylindrical projection 320.

Each of the camming arms 370 is also comprised of a pair of parallel extension members 390 disposed on the opposite side of the shaft 335 from the weighted projections 375, said extension members 390 extending in the direction of the near wall 30 and in parallel relationship to an imaginary radial 395 drawn from the axis 220 of the shaft 335. Disposed on the outermost ends of the extension members 390 of each of the camming arms 370 and in spatial proximity to the near wall 30 is a shoe member generally desigated 400 having a slightly arcuate externally fingered surface generally designated 403 exposed in the direction of the near wall 30. Each of the shoe members 400 is comprised of a web portion 404 and a toothed portion 407 formed of a resilient material such as rubber, the web portion 404 being secured to a rigid supporting member 406 integralling connecting the pair of extension members 390. The rigid supporting member 406 is provided with a plurality of serrations 408 on the outboard extremity thereof, such serrations being offset to provide underlying support for the corresponding resilient teeth of the toothed portion 407, as best illustrated in FIGS. 4 and 5. The shoe members 400, and in particular the resilient teeth 407 thereof, are provided with a high coefficient of friction such that documents 20 may be engaged thereby and cammed both upwardly and downwardly within the guideway 10 as the shafts 335 and camming arms 370 are bi-directionally rotated by the motor 350, as will be explained in greater detail infra. It is to be noted that during the upward camming action of documents within the guideway 10, the resilient teeth 407 are supported against flexing by their associated serrations 408, to thereby provide the documents with a positive upward movement to a viewing position within the guideway. It is also to be noted that during the downward camming action of documents to a flow position within the guideway 10, the teeth 407 are permitted to flex, as will be explained hereinafter.

A weighted collar 410 is fixed to the outermost extremities of each of the shafts 335 outboard of the camming arms 370, such collars 410 serving to generate a center of gravity for the camming arms 370 that is substantially coincidental with the axes 220 of the shafts 335. The weighted elongated projections 375 and the collars 410 collectively counteract the moment generated by the relatively remote shoe members 400 and documents 20 being cammed thereby. As such, the opposing moments are effectively cancelled and the center of gravity is located substantially in the axes 220 of the shafts thereby minimizing the rotational inertia that is to be overcome by the DC motor 350. This allows a relatively low powered and thus economical motor 350 to be used to drive the shafts 335 and to rotate the shoe members 400.

The shoe members 400 are enabled to interact with documents 20 in the guideway 10 by means of a pair of parallel and elongated apertures 415 formed in the near wall 30, such apertures being parallel and coincidental also to the arcs 420 shown in FIGS. 4 and 5 that are defined by the shoe members 400 during the upward and downward camming movement of documents 20. In the general area corresponding to and encompassing the elongated apertures 415 formed in the near wall 30, the opposite wall 40 of the guideway 10 is provided with an enlarged web portion 430 that extends approximately three inches in a longitudinal direction and approximately eight inches in a transverse direction, said enlarged portion 430 being slightly less diverging in its upper portion than the remainder of the far wall 40 to form a platen against which a document may be slidably cammed upwardly to a document viewing position and downwardly to a document flow position. The surface of the platen formed by the enlarged web portion 430 is composed of a metallic material having a relatively low coefficient of friction relative to the documents 20.

Operation

In the operation of the preferred embodiment of the invention, the metal screws 262 may be tightened to presettably fix the distance between the shoe members 400 and the platen 430 of the far wall 40 according to the known and unvariable thickness of the documents to be processed. Alternatively, the metal screws 262 may be backed away slightly from their fully tightened positions when documents of varying thickness are to be processed. When the metal screws 262 are backed away from their fully tightened positions, the leaf springs 130 will operate to apply a constant bias to the cap members 175. This enables the shoe members 400 to always return to a predetermined locus of points comprising the camming arc 420 in the guideway 10 as between the far wall 40 and near wall 30, whenever a document of abnormal thickness is cammably raised to the viewing position, the abnormal thickness of the document serving to bias the shoe member 400 in the direction of the near wall 30. It can thus be seen that when the screws 262 are adjusted in this manner, the leaf springs 130 will normally serve to bias the shoe members 400 in the direction of the far wall 40 of the guideway 10, such that a predetermined minimum pressure will be applied against a document of minimum thickness, and such that the shoe members 400 will yield in the direction of the near wall 30 to thereby lessen the pressure applied by the shoe members against a document of maximum thickness. It can also be seen that by adjusting the screws 262 in the manner above described, the shoe members 400 may be provided with a self-adjusting capability relative to varying document thicknesses, and relative also to differing guideway channel widths.

The motor 350 may be activated to rotate the shafts 335 whenever a DC bias is applied through a pair of wires 450 to the motor 350. The shafts 335 in turn will rotate the pair of camming arms 370 and associated shoe members 400 until the upper weighted projection 375 of each camming arm 370 comes into limiting contact with its associated cylindrical projection 320, as shown in FIG. 5. It will be noted that whereas potential bias may be applied to the motor 350 constantly, the shafts 335 may not be rotated beyond the points defined by the limiting contact of the upper and lower weighted projections 375 against the cylindrical projections 320. Once a limiting contact is made with the projections 320, continued rotation may only be had in the opposite direction and only after the polarity of the bias applied to the motor 350 is switched. The need for expensive clutching and declutching apparatus is accordingly eliminated in the preferred embodiment of the invention.

Once the shoe members 400 are activated upwardly to raise a document into viewing position against the platen 430, they are arcuately activated into the guideway 10 through the elongated apertures 415 and into tangential contact with the selected misread document 20. The selected document 20 is thus cammed upwardly against the palten 430 by the flexible teeth 407 of the shoe members 400, the high friction surfaces of the flexible teeth 407 serving to press the selected document 20 against the enlarged web portion 430 shown in FIG. 1, and to thereby slide the document into viewing position above the guideway 10. It is to be noted that during this upward camming movement of the flexible teeth 407 and document 20, the flexible teeth 407 are supported against excessive downward flexing by the underlying offset serrations 408 of the rigid supporting members 406 of the shoes. It can be seen from the arc 420 and diverging angles of the rear wall 40 and platen 430, as illustrated in FIGS. 4 and 5, that the pressure applied by the supported flexible teeth 407 against the document 20 is maximized at the outset of the upward arcuate movement of the shoe members 400, as shown in FIG. 4, and that the pressure applied by the teeth against the document is diminished slightly as the shoe members 400 reach their points of maximum upward arcuate movement, as shown in FIG. 5. This condition exists even when the screws 262 are backed way from their fully tightened positions, since the bias applied by the leaf springs 130 will only advance the shoe members 400 towards the far wall 40 a limited distance not extending beyond the locus of points defining the arcs 420, as mentioned supra. The shoe members 400 will accordingly not follow the diverging platen 430 beyond that locus. The purpose in providing a diminishing pressure of the shoe members 400 against the platen 430 at the uppermost points of the arcs 420, is to facilitate the tactile removal of the misread document should such action be found necessary following its viewing in the view station. On the other hand, the document may be cammably activated downwardly to its original relative position in the guideway 10 by reversing the polarity of the bias applied to the motor 350, whereupon the document is cammably activated downwardly along the arcs 420 described by the shoe members 400, the flexible teeth 407 of the shoe members in this instance not being supported against excessive upward flexing by the offset serrations 408, but being permitted to flex upwardly as limited only by the natural resiliency of the teeth. The purpose in permitting upward flexing of the teeth 407 during the return activation of the shoe members 400 is to prevent an overload on the motor 350 caused by the frictional drag of the shoe members 400 against the far wall 40 when the viewed check has been tactilely removed from the view station and the camming arms 370 and shoe members 400 are required to be arcuately activated downwardly to their home positions with no document 20 being present in the guideway 10 between the flexible teeth 407 and the far wall 40 of the platen 430.

While the above-referenced embodiment of the invention has been described in considerable detail with respect to the apparatus thereof, it will be appreciated that other modifications and variations therein may be made by those skilled in the art without departing from the true spirit and scope of the invention.

What is claimed is:
1. Document station apparatus for interceptibly removing selected documents from a flow of documents for purposes of viewing and tactile manipulation, said apparatus comprising:
  a. guideway means including a pair of walls for cahnneling the flow of documents therebetween;
  b. power means for providing rotational energy along the axis of said power means;
  c. a pair of frame means disposed on a first of said pair of walls of said guideway means for operatively supporting said power means; and
  d. externally fingered camming means radially disposed along the axis of said power means and traversing said first wall of said guideway means for frictionally engaging a selected document in said guideway means and for applying sufficient holding pressure on the selected document as backed by a second of said pair of walls of said guideway means to arcably cam the selected document up and out of said guideway means.

2. The document station apparatus according to claim 1 wherein the pair of walls of said guideway means are substantially parallel in their lower portions and substantially diverging as to each other in their upper portions.

3. The document station apparatus according to claim 1 wherein said power means includes one or more adjustable projections formed therein to be screwably positioned so that they may be restrained by said frame means for fixing the position of said power means relative to said frame means.

4. The document station apparatus according to claim 1 wherein said power means is an electric motor.

5. The document station apparatus according to claim 4 wherein said electric motor is a direct current motor whose direction may be reversed by switching the polarity of the bias applied to the motor.

6. The document station apparatus according to claim 1 wherein said pair of frame means include a pair of axes that are substantially transverse to said guideway means.

7. The document station apparatus according to claim 1 wherein said pair of frame means each include a top side that is substantially planar and transverse to said guideway means, and a side opposite to that disposed on said first wall that is substantially planar and parallel to said guideway means.

8. The document station apparatus according to claim 1 wherein said power means further includes shaft means axially extending from either end of said power means and radially connected to said externally fingered camming means for transferring power from said power means to said camming means.

9. The document station apparatus according to claim 8 wherein said pair of frame means further comprises a pair of cap means each disposed to have its axis substantially coincidental with and over each of the pair of said frame means and further being disposed between said power means and externally fingered camming means for supportably restraining said shaft means to rotate in its own axis.

10. The document station apparatus according to claim 9 wherein each of said pair of frame means has disposed on a side opposite said guideway means, biasing means operative to apply pressure to an end of said cap means also opposite said guideway means for biasing said cap means towards said guideway means.

11. The document station apparatus according to claim 10 wherein said biasing means is a leaf spring having a planar end disposed on each of said pair of frame means and having a convex end biasing said cap means.

12. The document station apparatus according to claim 9 wherein each of said pair of cap means is provided with a smooth-sided eccentrical bore having a major axis coincidental to the axis of said cap means, said eccentrical bore being traversed by a metal screw means having a smooth upper portion disposed in cooperating relationship therewith and a threaded lower portion operatively disposed within a threaded aperture formed in said frame means, whereby said cap means and said frame means may be manually or self adjustably positioned along their coincidental axis relative to each other depending on whether said metal screw means shas been relatively screwably tightened or untightened respectively.

13. The document station apparatus according to claim 9 wherein each of said pair of frame means has formed along the top side thereof a concave raceway whose axis is substantially coincidental to that of said frame means.

14. The document station apparatus according to claim 13 wherein each of said pair of cap means has formed in its underside a notch in an area adjacent to the concave raceway of said frame means.

15. The document station apparatus according to claim 14 wherein each of said pair of frame means further comprises a spherical bearing means operative to restrainably travel along the axis of said concave raceway while being restrained overhead by the notch in said cap means, said spherical bearing means being radially transversed by said shaft means for carrying said shaft means as a load and for acting as a buffer as between said cap means and said frame means.

16. The document station apparatus according to claim 9 wherein each of said pair of cap means further comprises a stop projecting extending out and away from each of said pair of frame means to be in operative contact with said camming means for use as a limit at the arc camming ends thereof when said camming means approaches either end of its camming arc.

17. The document station apparatus according to claim 6 wherein said externally fingered camming means radially disposed along the axis of said power means comprises a pair of camming devices disposed outwardly of said pair of frame means and said pair of cap means and in cooperating relationship with said shaft means.

18. The document station apparatus according to claim 17 wherein each of said pair of camming devices comprises a pair of elongated projections radially disposed about said shaft means in a direction opposite to said guideway means and operative to act as an upper and lower limit for the camming arc of said camming device when contact is made with said stop projection.

19. The document station apparatus according to claim 18 wherein said pair of elongated projections of each of said pair of camming devices are disposed from each other at or less than an acute angle along said camming arc.

20. The document station apparatus according to claim 18 wherein said pair of elongated projections of each of said pair of camming devices are weighted to counteract the moment generated by said camming means for assisting the generation of a center of gravity substantially about the axis of said shaft means.

21. The document station apparatus according to claim 18 wherein said pair of elongated projections of each of said pair of camming devices are coated with a resilient material in the area making contact with said stop projecting for insulating the remainder of said camming device from shock and vibration generated by the contact of one of the pair of elongated projections with said stop projection.

22. The document station apparatus according to claim 17 wherein each of said pair of camming devices includes one or more arms radially disposed from said shaft means towards said guideway means.

23. The document station apparatus according to claim 22 wherein each of said pair of camming devices further includes externally fingered shoe means disposed on the ends of said arms for cammably engaging the documents in said guideways means, said shoe means being comprised of a predetermined plurality of outwardly extending tooth-like fingers formed of a resilient material having a relatively high friction coefficient so that firm engaging contact with said documents may be assured throughout the camming arc of said camming device.

24. The document station apparatus according to claim 23 wherein said externally fingered shoe means of each of said camming devices is connected to associated ones of said radially disposed arms by means of a serrated rigid supporting member, the serrations of said supporting member being offset to provide underlying support to said outwardly extending tooth-like fingers during the upward camming of a document engaged thereby, the arrangement of said serrations relative to said outwardly extending tooth-like fingers serving to prevent excessive downward flexing of said fingers during the upward movement of said camming device in said camming arc, and to permit unrestrained upward flexing of said fingers during the downward movement of said camming device in said camming arc.

25. The document station apparatus according to claim 23 wherein the outwardly extending tooth-like fingers of each of said shoe means are provided with a slightly arcuate configuration for gradually engaging and disengaging the document at the beginning and end of the camming arc and such that engagement with and disengagement from the document will be free of any position jarring high impulse effects.

26. The document station apparatus according to claim 17 wherein said camming means further includes weighted collar means radially disposed on said shaft means outwardly of said pair of camming devices, said weighted collar means serving to counteract the moment generated by the camming means and to assist in the generation of a center of gravity substantially about the axis of said shaft means.

27. The document station apparatus according to claim 23 wherein said first wall of said guideway means is provided with a pair of apertures for allowing the externally fingered shoe means of said pair of camming devices to arcably travel therethrough to cammingly engage a document in said guideway means.

28. The document station apparatus according to claim 27 wherein said second wall in the vicinity of said pair of apertures formed in said first wall diverges relatively less from said first wall than the remainder of said second wall and extends relatively higher than the remainder of said second wall such that the tooth-like fingers of said pair of camming devices may apply a sufficient holding pressure against the document throughout its upward sliding movement relative to said second wall while still permitting tactile manipulation of the document at the top of the camming arc of said camming devices.

29. The document station apparatus according to claim 27 wherein said second wall in the vicinity of the pair of apertures formed in said first wall is provided with a relatively low friction coefficient on the surface area adjacent to the document.

30. A document interception device including a guideway having a pair of walls for upwardly removing and downwardly re-entering selected documents from and into the guideways without loss of position in the document queue, said device comprising:
   a. motor means for providing rotational energy along its axis;
   b. a pair of frame means disposed on a first of said pair of walls for providing operative support to said motor means;
   c. aperture means formed in said first wall and providing access to documents disposed in said guideway; and
   d. externally fingered engaging means radially disposed along the axis of said motor means and traversing said first wall through said aperture means for frictionally camming selected documents in the guideways and for applying a sufficient holding pressure on a selected document as backed by a second of said pair of wall to arcably cam the selected document up and out of the guideway.

31. The document interception device as defined in claim 30 wherein said externally fingered engaging means comprises:
   a. at least a pair of arcuately movable arms coupled to said motor means in cooperating relationship with said aperture means; and
   b. externally fingered shoe means disposed on the ends of said arms for cammably engaging documents in said guideways, said shoe means being comprised of a plurality of outwardly extending tooth-like fingers formed of a resilient material having a relatively high friction coefficient so that firm engaging contact with said selected documents may be assured throughout the camming arc of said arms.

32. The documents interception device as defined in claim 31 wherein each of said shoe means is connected to its associated arcuately movable arm by means of a serrated supporting member, the serrations of said supporting member being offset to provide underlying support to said outwardly extending tooth-like fingers during the upward camming of a document engaged thereby, the arrangement of said serrations relative to said outwardly extending tooth-like fingers serving to prevent excessive downward flexing of said fingers during the upward camming of a document in said guideway, and to permit unrestrained upward flexing of said fingers during the downward camming of a document into said guideway.

33. A document engaging mechanism for arcuately elevating selected documents from a stream of documents for viewing and possible tactile manipulation, and for arcuately lowering said selected documents into the stream following said viewing, said mechanism comprising:
   a. guideway means including a pair of walls for channeling the stream of documents therebetween;
   b. power means operatively supported on one of the pair of walls of said guideways means for providing rotational energy along the axis of said power means; and
   c. externally fingered camming means radially disposed along the axis of said power means and traversing one of the pair of walls of said guideway means for frictionally engaging said selected documents in said guideways means and for applying sufficient holding pressure on said documents as backed by the other of the pair of walls to arcuately elevate the selected documents up and out of said guideway means.

34. The document engaging mechanism as defined in claim 33 wherein said externally fingered camming means comprises shoe means including a plurality of outwardly extending tooth-like fingers formed of a resilient material having a relatively high friction coefficient for arcuately elevating and lowering selected documents from and into said stream, said tooth-like fingers being supported against excessive downward flexing during the arcuate elevation of said selected documents, and permitted unrestrained upward flexing during the arcuate lowering of said selected documents.

* * * * *